(12) United States Patent
Wang et al.

(10) Patent No.: US 9,934,202 B1
(45) Date of Patent: Apr. 3, 2018

(54) MANAGING PAGINATED DATA (71) Applicant: EMC Corporation, Hopkinton, MA (US)

(72) Inventors: Chao Wang, Shanghai (CN); Link Yu, Shanghai (CN); James Pendergraft, Raleigh, NC (US); Wei Wang, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 300 days.

(21) Appl. No.: 14/673,706

(22) Filed: Mar. 30, 2015

(51) Int. Cl.
 *G06F 7/00* (2006.01)
 *G06F 17/30* (2006.01)
 *G06F 17/21* (2006.01)

(52) U.S. Cl.
 CPC ...... *G06F 17/217* (2013.01); *G06F 17/30424* (2013.01)

(58) Field of Classification Search
 CPC ......... G06F 17/30991; G06F 17/30867; G06F 17/30864; G06F 17/30424; G06F 17/217
 USPC ................. 707/722, 728, 754, 758
 See application file for complete search history.

(56) References Cited

U.S. PATENT DOCUMENTS

| | | | | |
|---|---|---|---|---|
| 2013/0110822 A1* | 5/2013 | Ikeda | ................... | G06F 17/3087 707/722 |
| 2014/0019439 A1* | 1/2014 | Sebata-Dempster | ......... | G06F 17/30991 707/722 |
| 2014/0143245 A1* | 5/2014 | Qiao | ................... | G06F 17/3053 707/728 |

FOREIGN PATENT DOCUMENTS

EP    2608487 A1    6/2013

OTHER PUBLICATIONS

James, Paul, A RESTful Web service, an example, Retrieved at <<http://www.peej.co.uk/articles/restfully-delicious.html>>, Feb. 5, 2015, 11 pages.

* cited by examiner

*Primary Examiner* — MD I Uddin
(74) *Attorney, Agent, or Firm* — BainwoodHuang

(57) ABSTRACT

Examples are generally directed towards managing paginated data. A server receives a page-to-identifier query from a client. The page-to-identifier query includes an identifier of a selected object instance. The server generates an ordered list of object instances corresponding to at least one ordering criteria paginated into a set of pages. The server identifies a page in the set of pages including the selected instance to form a results page. The results page includes the selected instance. The server returns the results page to the client.

19 Claims, 5 Drawing Sheets

MANAGING PAGINATED DATA

BACKGROUND

A server may return a result set to a client in response to a client query. Some result sets may contain a relatively small numbers of records. In which case, the server may return the entire result set to the client in response to the query. However, other result sets may include dozens, hundreds, or even thousands of records. In such cases, it is not practical for the server to return the entire result set to the client due to performance penalties.

An application programming interface (API) may use paging to limit the number of records returned to the client. Most APIs typically return one page at a time to a client and limit the number of records included within each page. For example, if a result set includes 100 records, the API may paginate the records into ten pages having ten records per page. The API then returns only the first page of the result set, which includes only records one through ten, to the client. If the client wants record eleven, the client graphical user interface (GUI) must request the next page from the server. The next page returned to the client, by the server in this example, would include records eleven through twenty.

Although pagination assists the server in limiting the number of records returned to a client at one time, a user associated with the client must scroll and/or page through each page of the result set one page at a time to locate a particular record of interest to the user. In cases where a first page returned to the client does not include the desired record, the user is typically required to scroll through result set one page at a time until the desired record is located. This process can be a time-consuming, tedious, and inefficient process for users.

SUMMARY

Examples of the disclosure provide for managing paginated data. In an example, a server includes at least one processor, a memory storage device, and an application programming interface is provided. The memory storage device includes a memory area storing computer executable program code. The at least one processor executes the computer executable program code to process a page-to-identifier query received from a client. The page-to-identifier query includes an identifier of a selected instance. A page in a set of two or more pages that includes a list entry for the selected instance is identified to form a results page. The results page is returned to the client. The results page includes the list entry corresponding to the selected instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable management of paginated data. A server may paginate a result set that includes a large number of records into two or more pages, in which each page includes a portion of the records. In this case, the server only returns a single page to the client. The user at the client may scroll through the returned page to search for a desired record. However, if the first page returned to the client does not include the desired record, the client GUI must request the next page containing the next portion of the result set. The user then continues the process of scrolling through the second page to search for the desired record. If the second page returned to the client does not include the desired record, the client GUI must then request a third page, and so forth.

This known process of manually scrolling through each page of a result set searching for a desired record is time consuming and inefficient.

Moreover, once the user locates the desired record, the user may select the desired record to request a details page including detailed information regarding the selected record. However, if a user is viewing a details page, the user cannot make a bi-directional request for a page of an instances list that contains the selected record.

Aspects of the disclosure provide a page-to-identifier query. The page-to-identifier query includes an identifier of an instance of an object desired by the user. The page-to-identifier query may also include one or more ordering criterion.

Some aspects of the disclosure provide a systems management component that processes the page-to-identifier query to identify a results page that includes a list entry for the selected instance. The server returns the results page to the client. In this embodiment, the results page is a page selected from a set of two or more pages. In other words, the page size is two or more pages. In other embodiments, the page size may be one.

Aspects of the disclosure further enable an application programming interface that processes a page-to-identifier query to re-order a first result set in accordance with one or more ordering criterion to form a second result set. The second result set includes a plurality of re-ordered object instances in a paginated set of re-ordered pages.

The application programming interface of the disclosure identifies a page in the set of re-ordered pages that includes a selected instance associated with a user selected instance identifier. The server returns the results page that includes the selected instance to the client.

In some examples, the set of re-ordered pages is a set of two or more re-ordered pages. In other examples, the set of re-ordered pages may include only a single page. The results page selected from the set of re-ordered pages may include an indicator of the selected instance. The indicator may point to the selected instance in a list of instances. In other examples, the indicator may highlight the selected instance to assist the user in identifying the desired instance in the re-ordered list of instances on the results page.

Aspects of the disclosure enable a user to use efficient queries without losing user context where they are working with a list of items. Aspects also permit the user and/or client to obtain a desired page from a plurality of result set pages that includes a desired instance of an object using only a single page-to-identifier query instead of scrolling through each page in the plurality of result set pages one-by-one, until the desired instance is manually found by the user. The page-to-identifier query enables the user to request and obtain the page that includes the desired instance without knowing which page in a plurality of pages will include the desired instance after the plurality of instances are re-ordered.

Aspects of the disclosure enable a user to request and obtain a desired page that includes a selected object instance, using only a single query instead of using multiple queries, as is currently required using existing query response systems. Aspects of the disclosure enable a server to return the correct page that includes a desired instance instead of returning each page in a plurality of result set pages one-by-one until the user manually locates the desired instance.

The page-to-identifier query improves user efficiency and increases speed with which the user obtains a desired record. The page-to-identifier query conserves computer memory, reduces processor load, reduces memory consumption in the server and the client, and reduces network bandwidth usage needed to transfer data by reducing the number of client queries required to obtain the desired page. The page-to-identifier query also reduces the number of pages and number of records returned to the client by the server. The page-to-identifier query also reduces latency due to the transfer of large amounts of data from the server to the client over slow networks.

Figure 1:
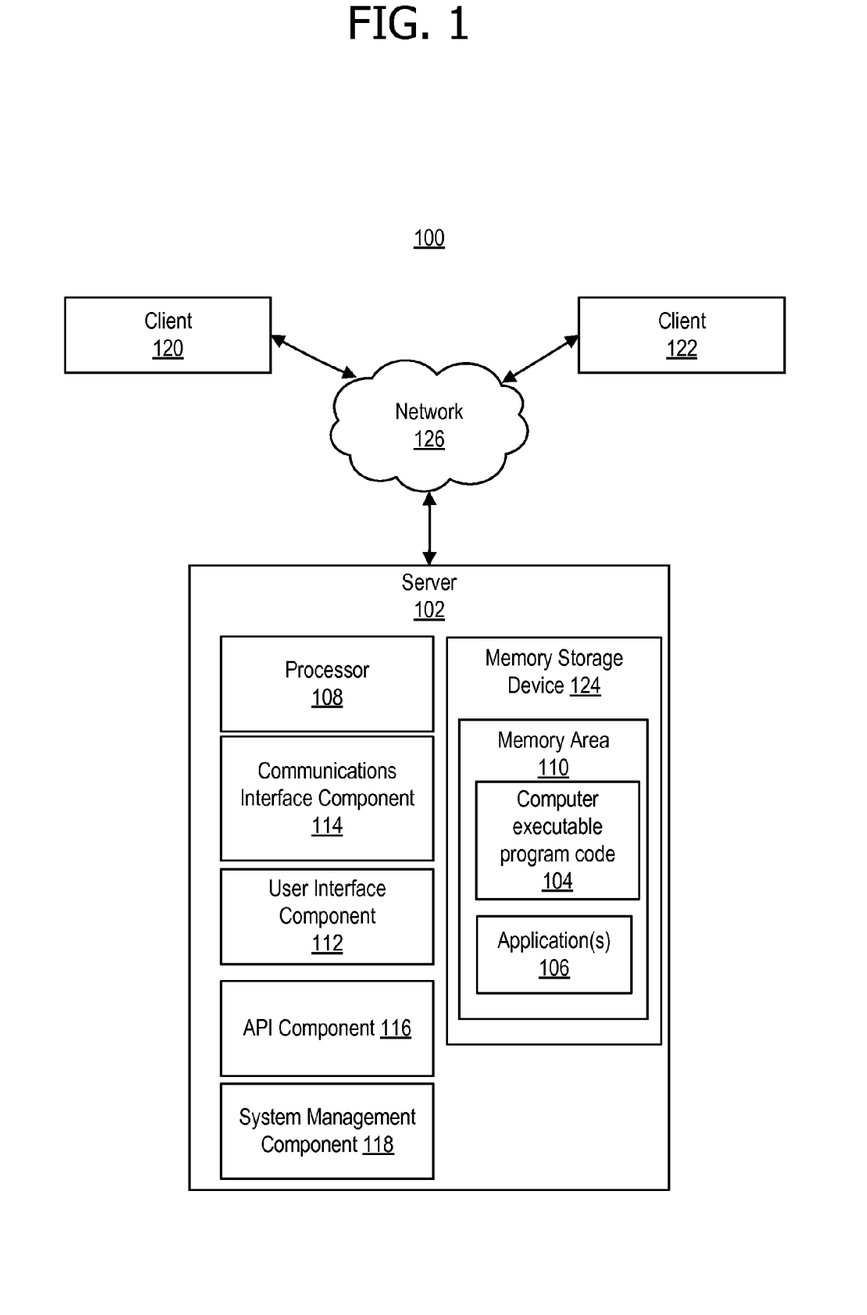
FIG. 1 is an exemplary block diagram illustrating a system for responding to page-to-identifier queries.

Referring to FIG. 1, an exemplary block diagram illustrates a system 100 for responding to page-to-identifier queries. In the example of FIG. 1, the data processing system represents a system for managing paginated data for page-to-identifier query responses. In this non-limiting example, system 100 includes a server-client network. However, aspects of the disclosure are not limited to server-client networks.

The server 102 is a computing device executing computer executable program code 104 (e.g., as application(s) 106, operating system functionality, or both) to implement the operations and functionality associated with the server 102. The server 102 may include a web server, an application server, a file server, a back-end server, a cloud server, or any other type of server. In another example, the server 102 is a server associated with a data storage system. In still another example, the server 102 may be any type of computing device for managing paginated data associated with request processing. In yet another example, server 102 may represent a group of processing units or other computing devices.

In some examples, the server 102 includes at least one processor 108, a memory area 110 associated with a memory storage device 124, and at least one user interface component 112. The processor 108 includes any quantity of processing units, and is programmed to execute computer executable program code 104 for implementing aspects of the disclosure. The computer executable program code 104 may be performed by the processor 108 or by multiple processors within the server 102, or performed by a processor external to the server 102. In some examples, the processor 108 is programmed to execute computer executable program code 104 such as those illustrated in the figures (e.g., FIG. 5).

The server 102 further has one or more computer readable media such as the memory area 110. The memory area 110 includes any quantity of media associated with or accessible by the server 102. The memory area 110 may be internal to the server 102 (as shown in FIG. 1), external to the server (not shown), or both (not shown). In some examples, the memory area 110 includes read-only memory (ROM) and/or memory wired into a computing device.

The memory area 110 stores, among other data, the computer executable program code 104 and the one or more application(s) 106. The application(s) 106, when executed by the processor 108, operate to perform functionality on the server 102. Exemplary application(s) 106 include, without limitation, mail server application programs, web services, address book services, messaging services, media services, location-based services, search programs, and the like. The applications may communicate with counterpart applications or services such as web services accessible via a network 126. For example, the applications may represent server-side applications executing in a cloud that corresponds to downloaded client-side services.

The memory area further stores one or more computer executable components. Exemplary components include a communications interface component 114, an application programming interface (API) component 116, and a system management component 118.

In this example, API component 116 is shown as a separate component from application(s) 106. However, in other examples, the system management component 118 is included within application(s) 106 of memory area 110.

API component 116, when executed, causes the processor to process a page-to-identifier query received from a client and return a results page, which includes a selected identifier, to the client. API component 116 identifies a results page and returns the results page to the client. In this non-limiting example, API component 116 is a representational state transfer (REST) API. However, the disclosure is not limited to REST API implementations.

A REST API follows and provides a client-server model, as shown in FIG. 1. A uniform interface separates clients from servers. This separation of concerns means that, for example, clients are not concerned with data storage, which remains internal to each server, so that the portability of client code is improved. Servers are not concerned with the user interface or user state, so that servers can be simpler and more scalable.

A REST API is stateless. Client context is not stored on the server between requests. Each request from a client contains all the information needed by the server to service the request. The necessary state to handle a particular request is contained within the request itself. The state may be included within the request as part of the URI, query-string parameters, body, or headers.

After the server processes the request, the appropriate state is returned back to the client via headers, status and/or the body of the response. In REST, the client includes all information that may be needed by the server to fulfill a particular request within the request message.

Applications and APIs conforming to the REST architecture may be referred to as a REST API. HTTP based REST APIs may include a base resource identifier (e.g., http://example.com/resources/), an Internet media type for the data, standard HTTP methods, hypertext links to reference state, and hypertext links to reference related resources. An Internet media type may include, for example but without limitation, hypertext markup language (HTML) or extensible markup language (XML). HTTP methods may include, without limitation, GET, PUT, POST, and DELETE. A REST API may also be compliant with the HTML standard.

In one example, a REST API may be used in connection with a data storage system management. A request may be issued from the client to GET properties of one or more instances of an object such as a POOL object in the object model used for data storage system configuration information. For example, the following is an example of a query or request that may be issued from the client to return values of two predefined properties for all POOL objects:
GET https://10.108.49.209/api/types/pool/instances?
fields=sizeTotal,sizeUsed.

The above is an example of a request that may be issued by a client, such as the data storage system management software, to obtain two predefined object properties of "sizeTotal" and "sizedUsed" defined in the object model for POOL objects. "sizeTotal" may represent the total size (e.g. amount of storage) in the POOL and "sizeUsed" may represent the amount of pool storage that has been used or consumed. For simplicity in this example, assume only a single POOL is currently defined.

In some examples, the communications interface component 114 includes a network interface card and/or computer executable program code (e.g., a driver) for operating the network interface card. Communication between the server 102 and other devices, such as client 120 and client 122, may occur using any protocol or mechanism over any wired or wireless connection.

In some examples, the user interface component 112 includes a graphics card for displaying data to the user and receiving data from the user. The user interface component may also include computer executable program code (e.g., a driver) for operating the graphics card. Further, the user interface component 112 may include a display (e.g., a touch screen display or natural user interface) and/or computer executable program code (e.g., a driver) for operating the display.

The system management component 118 is a system management component that may execute within the server 102. The system management component 118 optionally manages and monitors the server 102. In some examples, the system management component 118 processes page-to-identifier queries received from a client. In such cases, the system management component 118 identifies and/or generates an ordered list of object instances corresponding to at least one ordering criteria associated with a query.

The system management component 118 identifies a page in the set of pages including the selected instance to form a results page. The results page includes at least two entries for at least two instances. The at least two instances includes the selected instance. The server then returns the results page generated by the system management component to the client. The results page may be returned to the client via API component 116.

In this example, the system management component 118 is shown as a separate component from application(s) 106. However, in other examples, the system management component 118 is included within application(s) 106 stored in memory area 110.

In this example, the server 102 is connected via a network 126 to client 120 and client 122. The network 126 may include any type of network connection. In one example, the network 126 may be the Internet, an intranet, an Ethernet, or other wireless or hardwired connections by which the server 102 may send and receive data associated with one or more clients, such as, but without limitation, client 120 and/or client 122. However, other examples do not require a network 126.

Client 120 and client 122 represents any computing device executing instructions (e.g., as application programs, operating system functionality, or both) to implement the operations and functionality associated with the computing device. For example, client 120 may include a mobile computing device or any other portable device. In some examples, the mobile computing device includes a mobile telephone, laptop, tablet, computing pad, netbook, gaming device, and/or portable media player. The client 120 may also include less portable devices such as desktop personal computers, kiosks, tabletop devices, industrial control devices, wireless charging stations, and electric automobile charging stations. Additionally, the client 120 may represent a group of processing units or other computing devices.

In some examples, the client 120 includes one or more processor(s), a memory area, and at least one user interface. The processor includes any quantity of processing units, and is programmed to execute computer executable program code for implementing aspects of the disclosure. The instructions may be performed by the processor or by multiple processors within the client 120, or performed by a processor external to the client 120.

Client 120 stores one or more applications in a client memory area (not shown). The one or more applications may include an API (not shown) for sending page-to-identifier queries to the server 102. The API at the client may be a REST API.

Other exemplary client-side applications may include mail application programs, web browsers, calendar application programs, address book application programs, messaging programs, media applications, location-based services, search programs, and the like. The applications may communicate with counterpart applications or services associated with server 102, such as web services accessible via the network 126. For example, the applications may represent downloaded client-side applications that correspond to server-side services executing in a cloud.

In the example shown in FIG. 1, the system 100 includes a server 102, a network 126, client 120, and client 122. The system 100 may be implemented as a networked data processing system. However, the examples are not limited to a networked system including a server and multiple clients, as shown in FIG. 1.

In one example, the client 120 and server 102 may be implemented within a same computing device without a network connection. In another example, server 102 may be connected via a network to three or more client computing devices.

Figure 2:
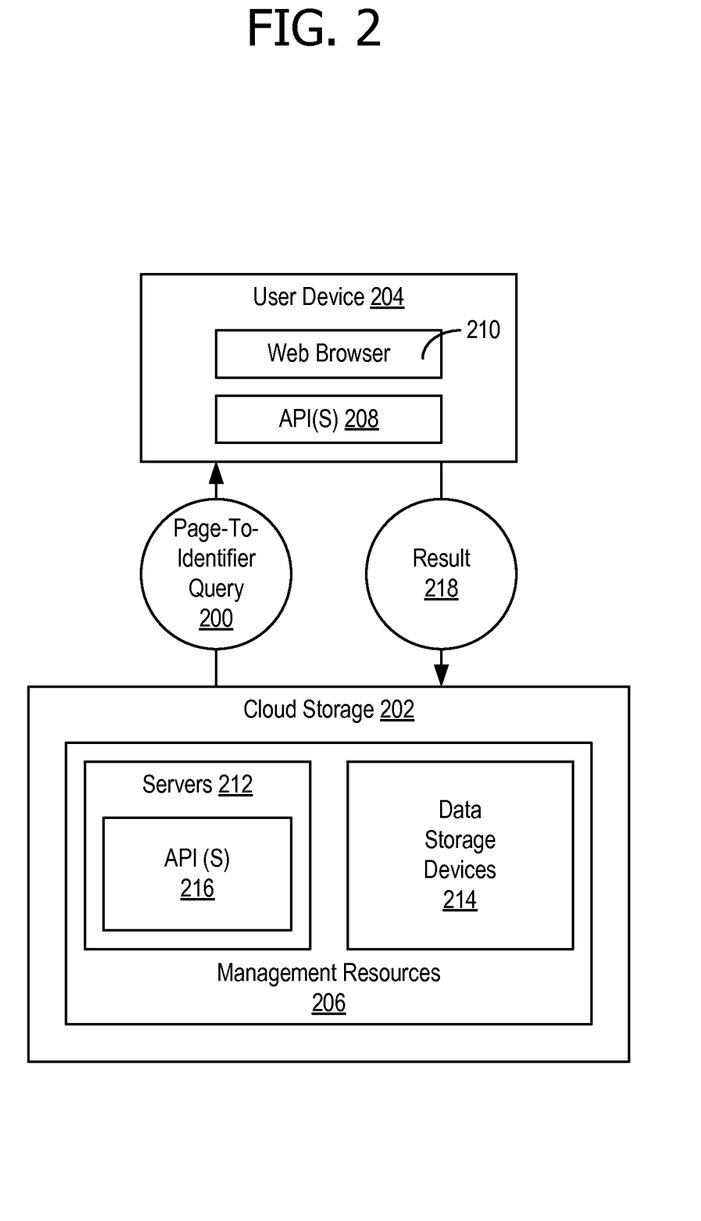
FIG. 2 is an exemplary block diagram illustrating a user device associated with a cloud storage system.

Referring now to FIG. 2, an exemplary block diagram illustrating a user device associated with a cloud storage system. Page-to-identifier query 200 is an API request associated with one or more management resources 206 of cloud storage 202. The page-to-identifier query 200 identifies a selected instance.

The user device generates the page-to-identifier query 200 in accordance with one or more application programming interfaces (APIs) 208. In this example, the page-to-identifier query 200 is a request in accordance with a REST API.

User device 204 may be any type of device capable of generating and sending a query and receiving a result 218 from cloud storage 202, such as, but not limited to, client 120 or client 122 in FIG. 1. For example, the user device 204 may be a desktop computer, a laptop computer, a tablet computer, a smart phone, or any other type of user device.

Cloud storage 202 is a data storage system including one or more management resources 206. The management resources 206 may include, for example and without limitation, one or more data storage device(s) 214, logical pools, logical units (LUNs), one or more server(s) 212, and any other hardware or software which may be associated with a cloud storage system.

The one or more data storage device(s) 214 includes at least one data storage device. In some embodiments, the one or more data storage device(s) 214 may include a data storage array. A data storage array includes a plurality of data storage devices. The data storage device(s) 214 may also include one or more types of data storage devices, such as, for example, one or more rotating disks drives and/or one or more solid state drives (SSDs).

The user device 204 may access cloud storage 202 resources and services via an application that utilizes the one or more API(s) 208, such as, but not limited to, a cloud storage gateway, a web-based content management system, or a web browser. For example, web browser 210 may generate and transmit the page-to-identifier query 200 requesting a web page to cloud storage 202 via a web service API.

The one or more server(s) 212 receives the page-to-identifier query 200 via one or more API(s) 216. In this non-limiting example, API(s) 216 includes a REST API. The one or more server(s) 212 processes the page-to-identifier query 200 and generates result 218 to the user device 204. The result 218 is a page including the selected instance. For example, the page may be a web page returned to the browser 210.

Figure 3:
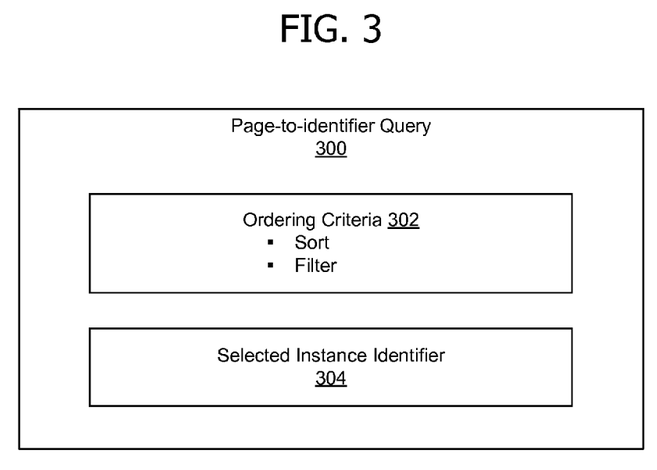
FIG. 3 is an exemplary block diagram illustrating a page-to-identifier query.

Referring now to FIG. 3, an exemplary block diagram illustrating a page-to-identifier query is shown according to one or more example implementations. In this example, page-to-identifier query 300 is a query sent to server 102 by client 120. The page-to-identifier query 300 includes ordering criteria 302 and a selected instance identifier 304.

Ordering criteria 302 is any criteria included within a parameter of the page-to-identifier query that changes an order of records listed in a result set when the ordering criteria is applied to the result set. Ordering criteria may include a single criterion, as well as two or more criteria for changing an order of records in a result set.

In this example, ordering criteria 302 may include, without limitation, sort criteria and/or filter criteria. In other words, ordering criteria 302 may include only sort criteria, include only filter criteria, or include both sort and filter criteria. For example, an ordering criterion may be a sort instances by a property's value in ascending order. In another example, an ordering criterion may be a sort by property value in descending order. In other examples, a user may sort by multiple properties, some ascending and some descending as well.

In still another non-limiting example, ordering criteria may include a re-set or changed limit, a re-set or changed offset, sort by name, sort by size used, sort by percent used, sort by serial number, sort by role, sort by page size, filter instances that are more than 50% full, or any other criteria. Any ordering criteria which may be used to change an order or sequence of items in a result set returned by a server may be used in accordance with the examples.

To further illustrate, this exemplary page-to-identifier request:
GET <server ip>/api/types/disk/instances?orderby=name&pagetoID=<instance id>
is a request for a collection of disk instances. This page-to-identifier request is a GET request corresponding to a REST API. This page-to-identifier request includes an ordering criteria "orderby=name" which requests that the instances be ordered by the name of each instance. The "<instance id>" parameter is a parameter field for the identifier of the selected instance identifier 304.

The selected instance identifier 304 is an identifier for identifying a given instance of an object selected by a user associated with the client. In one example, the selected instance is an instance selected by a user from a specific instance details page, such as details page 400 in FIG. 4 below. In another example, the selected instance associated with the selected instance identifier 304 is an instance of an object selected from an ordered list or set of object instances of a result set, as shown in FIG. 4 below.

Figure 4:
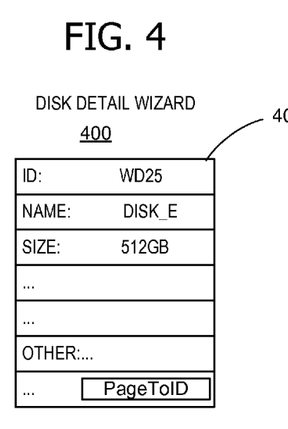
FIG. 4 is a block diagram of a specific instance details page.

FIG. 4 is a block diagram illustrating a specific instances details page in accordance with one or more example implementations. In this example, a details page 400 is a specific instance details page that provides data associated with a specific object instance to a client, such as client 120 in FIG. 1, shown above. The details page 400 does not include any other instances or data associated with any other object instances.

In other words, the details page 400 only includes values for a single object instances. Instances other than the selected instance are excluded from the details page. Likewise, data associated with any other instance is excluded from the details page 400.

In this example, the details page includes information for an instance "WD25". The details page 400 includes information describing the object instance having identifier "WD25". The data in details page 400 for instance "WD25" includes the name of the instance "Disk_E" and the size 512 gigabytes.

This example shows a selected instance that is a disk resource. However, in other examples, a selected instance may be an instance of any type of object or resource. For example, a selected instance may be an instance of a contacts object, a file, a logical unit (LUN), a user, or any other type of resource associated with a computing device.

The details page 400 includes the properties "name" and "size" for instance "WD25". However, other examples may include additional data in the details page 400. For example, a details page may include information about available space on Disk_E, the number of files on Disk_E, or any other information.

Likewise, the details page 400 in other examples may not include a "name" property or a "size" property for the selected instance. A different example may include a "role" property or any other type of appropriate data describing a selected instance.

In this example, a client sends a page-to-identifier query associated with the identifier 402 of the selected instance to a computing device, such as, but without limitation, server 102 shown in FIG. 1 above. To further illustrate, the following uniform resource locator request:
GET https://10.108.42.209/api/types/disk/instances?
 pagesize=10&orderby=name&pagetoID=WD25
is a non-limiting example of a page-to-identifier query for the selected instance. This exemplary page-to-identifier request includes two ordering criterion, a page size equals ten limit criterion and a sort by name criterion. The ip address "10.108.42.209 is a server ip. The specified resource is a disk resource. And the identifier "WD25" identifies the selected instance.

The server calculates a page index for a page in a plurality of results pages associated with an instances list entry for the selected instance. The page index is the page number or other page identification for a given page in a plurality of pages. The page index identifies a page that includes the selected instance.

Figure 5:
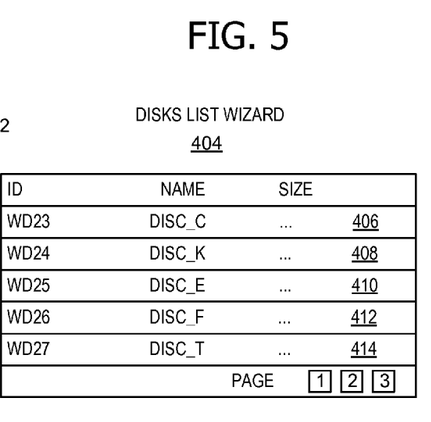
FIG. 5 is a block diagram of a results page.

FIG. 5 is a block diagram illustrating a results page. Results page 404 is a page returned by a server in response to a page-to-identifier query identifying the selected instance 402. Results page 404 is a page identified from a plurality of results pages.

In this example, the results page is page 2 in a set of 4 pages. In other words, the result set in this example is paginated into 3 pages. The server determines that the page index for the page that includes the selected instance is page 2 from the set of 3 pages.

In this example, the results page 404 includes a plurality of list entries. A list entry may be referred to an entry, a row, or a record. For example, instance list entry 406 is a list entry for an instance associated with identifier "WD23" and name "Disk_C". Instance list entry 414 is a list entry for an object instance having identifier "WD27" and the name "Disk_T".

The results page 404 includes an instances list entry 410 for the selected instance identifier "WD25" selected from the details page 400. The results page 404 also includes at least one instance list entry for an instance adjacent to the selected instance. An adjacent instance is an instance that immediately precedes a selected instance in an ordered list. An adjacent instance may also include an instance that immediately follows a selected instance in an ordered list. An ordered list is a list in which instances are ordered according to at least one ordering criterion, such as ordering criteria 202 in FIG. 2.

In this example, the instance list entry 408 for instance identifier "WD24" is an adjacent instance to the selected instance. Likewise, the instance list entry 412 for instance identifier "WD26" is also an adjacent instance to the selected instance.

In this example, the results page 404 provides data associated with object instances displayed in a plurality of horizontal rows in which data associated with each instance is included within a horizontal row. The row for the selected instance entry includes the instance identifier "WD25" and the instance name "Disk_E". However, in other example, data associated with one or more instances may be displayed within a results list in any manner. For example, data associated with an instance may be displayed in vertical columns. In other examples, the results page 404 may include instances and instances data displayed in a graph, a grid, a chart, or any other manner.

The server returns the results page 404 to the client instead of returning the first page in the set of 3 pages. The returned results page in this non-limiting example includes two or more instances in a list of entries. In this example, the results page 404 includes instances list entries 406, 408, 410, 412, and 414 for five different instances, including the selected instance 410.

In one example, the results page 404 returned to the client are scrolled to the selected instance. In other words, if the selected instance is located near a bottom of the results page 404, the results page 404 will be displayed on the display device of the client such that the bottom portion of the results page including the selected instance is visible on the display screen. In one example, the selected instance may be highlighted to increase visibility of the selected instance in the instances list.

The user at the client receives page 2 as the results page 404, which includes the selected instance, instead of receiving page 1, which does not include the selected instance. The client receives page 2 without having to select page 2 and without having to scroll down to row 410 corresponding to the desired instance.

The client in this example goes from displaying the details page 400 to displaying page 2 from a set of 3 pages without specifically requesting the server return page 2. In fact, at the time of sending the page-to-identifier query, the client and/or user did not know which page would include the selected instance or even how many pages would be included in the result set.

When the client receives results page 2 from the server, the user is able to view the page displaying the portion of the result set that includes the selected instance desired by the user without scrolling through the page and without receiving a page that does not include the desired instance.

Thus, the page-to-identifier query function as described above with regard to FIG. 3 enables a REST API to support a bi-directional page-to-identifier query between a details page and a result set page that contains the selected instance. The user is also able to view those instances adjacent to the selected instance. This aspect of the disclosure provides a quick way for a user to access the adjacent instances of a known selected instance.

Figure 6:
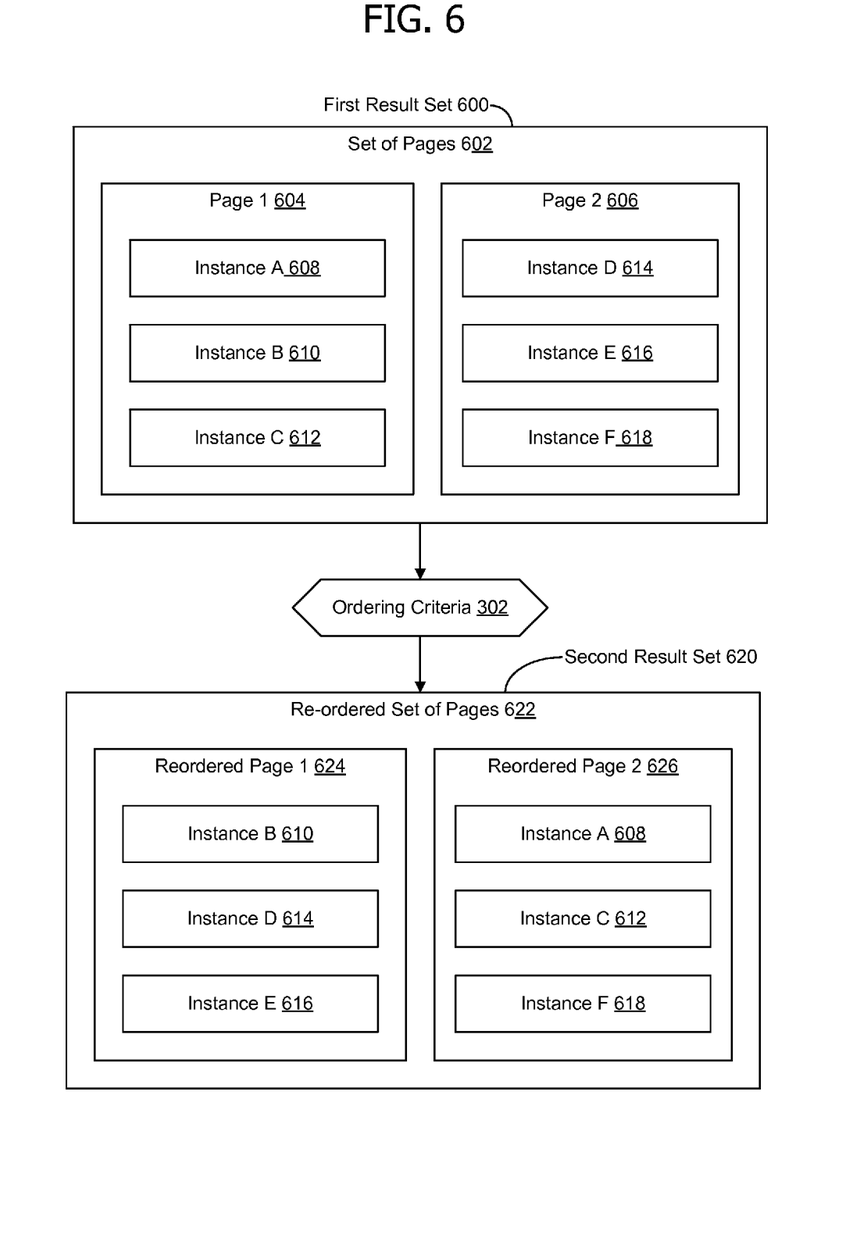
FIG. 6 is a block diagram illustrating a first result set and a second result set.

Referring now to FIG. 6, a block diagram illustrating a first result set and a second result set is shown according to one or more example implementations. In this example, a first result set 600 includes a plurality of object instances listed in an ordered list. The instances in the first result set 600 are paginated into set of pages 602. The set of pages 602 includes two or more pages. In this example, the set of pages 602 includes a first page 604 and a second page 606.

The first page 604 includes a portion of the first result set 600. The portion of the first result set 600 may be displayed within the first page 604 as a list of one or more instances. In this example, the first page includes instance A 608, instance B 610, and instance C 612 listed in a first order.

The second page 606 includes another portion of the first result set 600. The portion of the result set included in the second page 606 is a different portion of the result set than the portion of the result set included in the first page 604. In this example, the second page 606 includes instance D 614, instance E 616, and instance F 618 listed in the first order.

The first order is an order in accordance with one or more ordering criterion. The first order may be an ascending order, a descending order, order by date of creation/date of instantiation of the instance, or any other ordering criterion.

In this example, the first page is being displayed on a display device associated with a GUI of client 120. The page being displayed on the display device may be referred to as a current page. This page may also be referred to as a selected page from which the user selects an instance to form the selected instance.

In this example, the user selects an instance, such as instance C 612, from the first page 604. A user may select an instance using any appropriate method, device, or means that is known or will become available for making a selection of an item. In one non-limiting example, a user may select an instance by touching the instance identifier on a touch screen. In another non-limiting example, the user may select an instance from an instance list by clicking on a row associated with the selected instance. In still another example, the user may select an instance by using a mouse, touch pad, or other device for clicking on the identifier for the instance.

The client sends page-to-identifier query 200 to a server, such as, but not limited to, server 102 in FIG. 1. The page-to-identifier query 200 includes an identifier identifying instance C 612 and ordering criteria 202. Ordering criteria 202 may be one or more ordering criterion for changing an order of the plurality of instances included within the first result set 600.

The server 102 receives the page-to-identifier query. The server processes the page-to-identifier query. The server 102 re-orders the first result set in accordance with the ordering criteria 202 to generate a second result set 620. The second result set includes a plurality of re-ordered object instances paginated into a re-ordered set of pages 622. The re-ordered set of pages 622 includes two or more pages.

In this example, the set of re-ordered pages 622 includes a re-ordered first page 624 and a re-ordered second page 626. The re-ordered first page 624 includes a portion of the second result set 620. The second re-ordered page 626 includes another portion of the second result set 620.

The first re-ordered page 624 in this example includes instance B 610, instance D 614, and instance E 616 listed in a second order. The second order is a different order than the first order. The first re-ordered page 624 includes at least one instance, instance E 616, that is absent from the first page 604. Likewise, the first page 604 includes at least one instance that is not included in the first re-ordered page 624. In this example, the instance C 612 is included in the first page 604 but instance C 612 is excluded from the first re-ordered page 624 due to the change in the order of the instances in the second result set.

The second re-ordered page 626 in this example includes instance A 608, instance B 610, and instance F 618 listed in the second order. In this non-limiting example, the second re-ordered page 626 includes at least one instance that is not included in the second page 606. For example, the second re-ordered page includes instance A 608 and instance B 610, which are excluded from second page 606.

Likewise, the second page 606 may include one or more instance that is not included in the second re-ordered page 626. For example, in this non-limiting example, the second page 606 includes instance D 614 and instance E 616, which are excluded from the re-ordered second page 626. Thus, the re-ordered set of pages 622 includes object instances listed in a different order than the set of pages 602.

Thus, if a user is viewing a selected instance C 612 the first page 604 at the client, when the client sends a traditional query including one or more ordering criteria to the client to change the way the instances in the result set are ordered or filtered, the server will apply the ordering criteria and change the order of the instances. In this case, the re-ordered first page 624 will no longer include the selected instance C 612. Instead the re-ordered first page 626 will only include instance B 610, instance D 614, and instance E 616. If the API returns the re-ordered first page, the user at the client will be forced to search the re-ordered first page for the selected instance C 612. When the user determines that the selected instance C 612 is not included in the re-ordered first page, the client would be forced to request the next page in the re-ordered set of pages. This is a time consuming process.

Instead, aspects of the disclosure send a page-to-identifier query from the client to the server. The page-to-identifier query includes an identifier of the selected instance. The server determines whether the re-ordered first page 624 includes the selected instance C 612. On determining that the re-ordered first page 624 excludes the selected instance 612, the server determines which page in the re-ordered set of pages 622 includes the selected instance C 612 to form a results page. The results page includes the portion of the second result set 620 that includes the selected instance C 612.

The server returns the results page to the client instead of returning the first re-ordered page 624. This prevents the user from having to page through each page in the re-ordered set of pages 620 to locate the desired instance C 612.

In this example, the user selects the instance C 612 from the first page 604 prior to the re-ordering. However, in other examples, the user may select an instance from a page in a set of pages that is not a first page. For example, in FIG. 6, the user may select instance E 616 from the second page 606 prior to the re-ordering. After the server applies the ordering criteria 202 to the first result set to generate the second result set, the server determines if the selected instance E 616 is still included within the re-ordered second page. In this case, the server determines that the selected instance is no longer included within the re-ordered second page. The server identifies the re-ordered first page as the page in the set of pages that includes the selected instance E 616. The server then returns the re-ordered first page 624 to the server as the results page, in this example.

In yet another example, the results page may be the current page. For example, in FIG. 6, the user may select instance F 618 in the second page 606 as the selected instance. In this case, the second page 606 is the current page being viewed by the user associated with the client. The client sends the page-to-identifier query with the ordering criteria 202 and the instance identifier for instance F 618 to the server. In this example, when the server processes the page-to-identifier query, the server determines that the re-ordered second page 626 still contains the selected instance F 638. In this example, the server returns the re-ordered second page 626 to the client.

Figure 7:
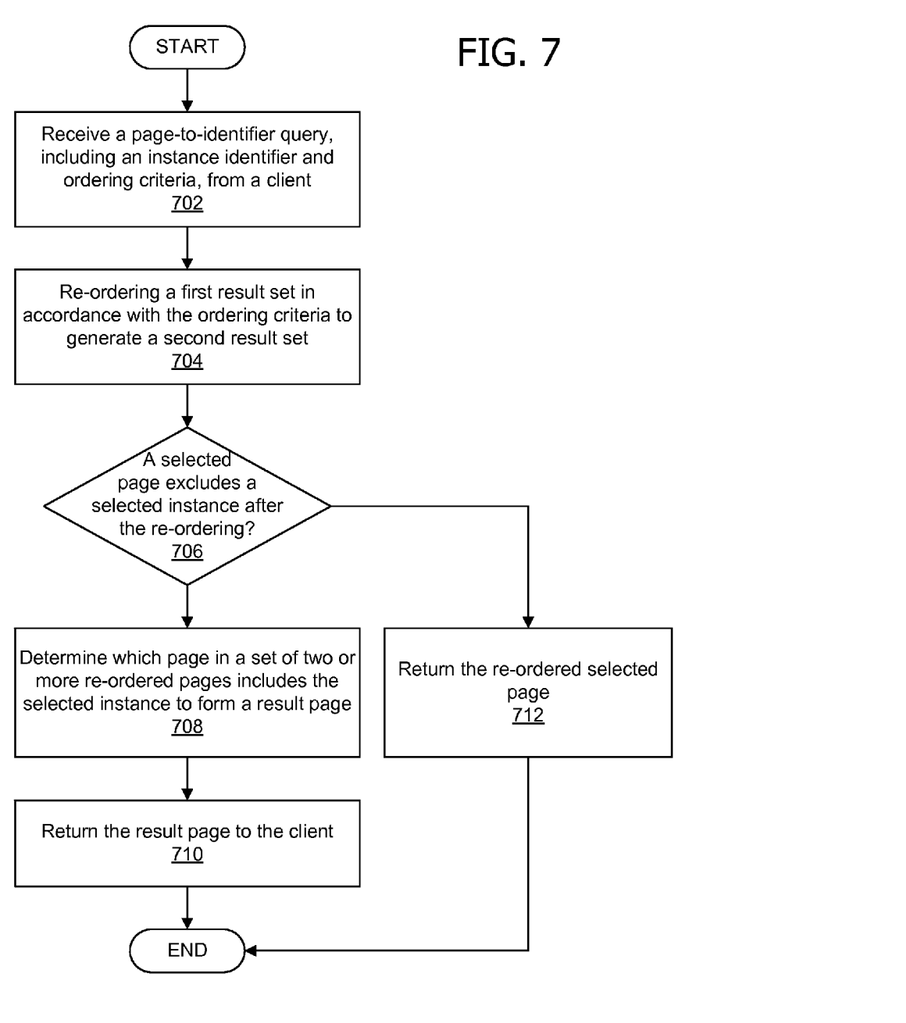
FIG. 7 is an exemplary flow chart illustrating operation of the computing device to return a results page to a client in response to a page-to-identifier query.

FIG. 7 is an exemplary flow chart illustrating operation of the computing device to return a results page to a client in response to a page-to-identifier query in one or more example implementations. The process shown in FIG. 7 may be implemented by a computing device, such as, but without limitation, server 102 in FIG. 1.

The process begins by receiving a page-to-identifier query, including an instance identifier and ordering criteria, from a client (operation 702). The ordering criteria may be a single ordering criterion, as well as two or more ordering criteria.

The process re-orders the first result set in accordance with the ordering criteria to generate a second result set (operation 704). The second result set is paginated into two or more pages.

The process determines whether a selected page in the two or more pages excludes the selected instance after the re-ordering (operation 706). If the selected page excludes the selected instance after the re-ordering, the process determines which page in the set of two or more re-ordered pages includes the selected instance to form a results page (operation 708). The process returns the results page to the client (operation 710) with the process terminating thereafter.

Returning now to operation 706, if the process determines that the selected page includes the selected instance, the process returns the re-ordered selected page to the client (operation 712) with the process terminating thereafter.

In some examples, the server may receive a second page-to-identifier query. The second page-to-identifier query includes a second selected instance identifier and a second ordering criteria. The second selected instance is associated with a current page being displayed within a graphical user interface on the client. The current page may be a details page, such as details page 400 in FIG. 3. In another example, the current page may be an instances list page listing one or more instances, such as results page 404 in FIG. 6, the first re-ordered page 624 in FIG. 6, or the second re-ordered page 626 in FIG. 6.

For example, a user may select an instance from a results page associated with a second result set of instances in a second order to form a second selected instance. The user may then send a page-to-identifier query including the second selected instance and one or more ordering criterion. The server in this example applies the ordering criteria to the second result set to generate a third result set. The third result set includes a plurality of instances listed in a third order. The third order is a different order than the second order. The server determines which page in the re-ordered set of pages associated with the third result set includes the second selected instance to form a new results page. The server returns this new results page to the client. The new results page includes one or more instances listed in the third order. The second selected instance is included within the one or more instances in the results page.

In another example, a user may select an instance from a results page that is not the selected instance to form a second selected instance. The user may request a details page for the second selected instance. From the details page, the user may then request an instances list for the second selected instance by sending a page-to-identifier query for the second selected instance. The server may then return a new results page including the second selected instance and at least one adjacent instance in an ordered instances list.

In another example, a server receives a page-to-identifier query from a client. The page-to-identifier query includes an ordering criteria and an identifier of an instance selected from an ordered list of instances paginated into a set of pages. The server re-orders the instances in accordance with the ordering criteria to generate a re-ordered list of instances paginated into a set of re-ordered pages. If a selected page excludes the selected instance after the re-ordering, the server determines which page in the set of re-ordered pages includes the selected instance to form a results page. The server returns the results page to the client. The results page includes a re-ordered list of instances. The re-ordered list of instances includes the selected instance corresponding to the identifier.

In some examples, the operations illustrated in FIG. 7 may be implemented as software instructions, such as computer executable program code, encoded on a computer readable medium, in hardware programmed or designed to perform the operations, or both. For example, aspects of the disclosure may be implemented as a system on a chip or other circuitry including a plurality of interconnected, electrically conductive elements.

While aspects of the disclosure have been described in terms of various examples with their associated operations, a person skilled in the art would appreciate that a combination of operations from any number of different examples is also within scope of the disclosure.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable program code, data structures, program modules or other data. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable program code, data structures, program modules, or other data in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer executable program code, such as program modules, executed by one or more computers or other devices in software, firmware, hardware, or a combination thereof. The computer executable program code may be organized into one or more computer executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer executable program code or the specific components or modules illustrated in the figures and described herein. Other examples of the disclosure may include different computer executable program code or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein, but within the scope of aspects of the disclosure, constitute exemplary means for implementing page-to-identifier queries and page-to-identifier query responses. For example, the elements illustrated in FIG. 1, such as when encoded to perform the operations illustrated in FIG. 5, constitute exemplary means for managing paginated data and exemplary means for responding to page-to-identifier queries via an API.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method for managing paginated data by a server, the method comprising:
   receiving a page-to-identifier query from a client, the page-to-identifier query including an ordering criteria and an identifier of a selected instance, the selected instance being selected from a first result set, the first result set including a plurality of object instances listed in a first order and paginated into a first set of two or more pages, a current page in the first set of two or more pages including the selected instance, the current page being displayable within a graphical user interface (GUI) of the client, the current page having a current page number, wherein the page-to-identifier query enables the client to work with a list of items without losing user context and to obtain a result set page from a plurality of result set pages that includes a desired object instance, and wherein the page-to-identifier query enables a representational state transfer (REST) application programming interface (API) to support a bi-directional page-to-identifier query between a details page and the result set page that includes the desired object instance;
   re-ordering, by a processing device associated with the server, the first result set in accordance with the ordering criteria included in the page-to-identifier query to generate a second result set, the second result set including a plurality of re-ordered object instances listed in a second order;
   paginating, by the processing device associated with the server, the second result set into a second set of two or more pages;
   determining that a page in the second set of two or more pages having a page number that corresponds to the current page number excludes the selected instance after the re-ordering of the first result set;
   having determined that the page in the second set of two or more pages having the page number that corresponds to the current page number excludes the selected instance, identifying another page in the second set of two or more pages that has a portion of the second result set including the selected instance corresponding to the identifier included in the page-to-identifier query;
   forming a results page that corresponds to the identified page, the results page including the selected instance corresponding to the identifier included in the page-to-identifier query;
   returning the results page to the client for display within the GUI of the client;
   receiving a page-to-identifier query comprising an identifier of a specific instance of an object associated with a specific instance details page to form the selected instance, wherein the specific instance details page provides data associated with the specific instance to the client, wherein other object instances are excluded from the specific instance page, and wherein data associated with any other object instance is excluded from the specific instance details page;
   calculating a page index for a page associated with an instances list entry of an instances list for the selected instance to form the results page; and
   returning the results page comprising the instances list entry for the selected instance to the client in response to the page-to-identifier query, wherein the instances list includes the selected instance.

2. The computer-implemented method of claim 1, wherein the second order is a different order than the first order, and wherein the results page includes at least one object instance that is absent from the current page.

3. The computer-implemented method of claim 1, wherein the second order is a different order than the first order, and wherein the current page includes at least one object instance that is absent from the results page.

4. The computer-implemented method of claim 1, further comprising:
   receiving a second page-to-identifier query from the client, the second page-to-identifier query comprising a second ordering criteria and an identifier of a second selected instance, wherein the second selected instance is associated with the current page being displayable within the GUI of the client;
   re-ordering the second result set in accordance with the second ordering criteria to generate a third result set, wherein the third result set comprises a plurality of re-ordered object instances listed in a third order that is a different order than the second order; and
   returning a new page in the set of two or more pages to the client, the new page comprising the second selected instance.

5. The computer-implemented method of claim 1, wherein the current page includes at least two object instances from the plurality of object instances displayable in a plurality of rows, wherein a first object instance in the at least two object instances is displayable in a first row of the current page, and wherein a second object instance in the at least two object instances is displayable in a second row of the current page;
   receiving a user selection of a row corresponding to the selected instance; and
   sending the results page to the client, wherein the results page includes the selected row corresponding to the selected instance.

6. The computer-implemented method of claim 1, further comprising:
   receiving the page-to-identifier query, by an application programming interface of the server;

processing the page-to-identifier query in accordance with the application programming interface; and returning the second page to the client, by the application programming interface.

7. The computer-implemented method of claim 1, wherein the ordering criteria comprises at least one of a filtering query parameter and a sort query parameter.

8. The computer-implemented method of claim 1 wherein the returning of the results page to the client includes avoiding returning any of the remaining pages of the second set of pages to the client.

9. The computer-implemented method of claim 1 further comprising:
 effectively scrolling the results page so that at least the selected instance is displayable within the GUI of the client.

10. The computer-implemented method of claim 9 further comprising:
 having effectively scrolled the results page so that at least the selected instance is displayable within the GUI of the client, highlighting the selected instance for display within the GUI of the client.

11. One or more computer storage media embodying computer executable components, said computer executable components comprising a systems management component that, when executed, causes at least one processor to:
 receive a page-to-identifier query via an application programming interface (API) of a client, the page-to-identifier query including an identifier of a selected instance of an object and an ordering criteria, wherein the selected instance is selected from a first result set, the first result set including a first set of two or more object instances listed in a first order and paginated into a first set of two or more pages, wherein a first page from the first set of two or more pages includes the selected instance, the first page being displayable within a graphical user interface (GUI) of the client, the first page having a first page number, wherein the page-to-identifier query enables the client to work with a list of items without losing user context and to obtain a result set page from a plurality of result set pages that includes a desired object instance, and wherein the page-to-identifier query enables a representational state transfer (REST) application programming interface (API) to support a bi-directional page-to-identifier query between a details page and the result set page that includes the desired object instance;
 re-order the first result set in accordance with the ordering criteria included in the page-to-identifier query to generate a second result set, the second result set including a second set of two or more object instances listed in a second order, wherein the second order is different from the first order;
 paginate the second result set into a second set of two or more pages;
 determine that a page in the second set of two or more pages having a page number that corresponds to the first page number excludes the selected instance after re-ordering the first result set;
 having determined that the page in the second set of two or more pages having the page number that corresponds to the first page number excludes the selected instance, identify another page in the second set of two or more pages that corresponds to an instances list page including a set of two or more object instances in a plurality of rows, the set of two or more object instances including the selected instance corresponding to the identifier included in the page-to-identifier query;
 form a results page that corresponds to the instances list page;
 return the results page to the client for display within the GUI of the client, wherein the results page includes the selected instance and a set of adjacent instances in an ordered list of object instances, the set of adjacent instances including at least one object instance adjacent to the selected instance in the ordered instances list;
 receive a page-to-identifier query comprising an identifier of a specific instance of an object associated with a specific instance details page to form the selected instance, wherein the specific instance details page provides data associated with the specific instance to the client, wherein other object instances are excluded from the specific instance page, and wherein data associated with any other object instance is excluded from the specific instance details page;
 calculate a page index for a page associated with an instances list entry of an instances list for the selected instance to form the results page; and
 return the results page comprising the instances list entry for the selected instance to the client in response to the page-to-identifier query, wherein the instances list includes the selected instance.

12. The computer storage media of claim 11, wherein the system management component is further executed to cause the at least one processor to:
 receive a second page-to-identifier query from the client, the second page-to-identifier query including the at least one ordering criteria and an identifier of a second selected instance associated with the results page;
 re-order a plurality of object instances listed in the first order within the results page in accordance with the at least one ordering criteria to generate a plurality of re-ordered object instances listed in the second order and paginated into a set of two or more re-ordered instances list pages, wherein the selected instance is excluded from the results page after the re-ordering of the plurality of object instances listed in the first order; and
 return a second results page to the client for display within the GUI of the client, the second results page including at least two object instances listed in the second order, wherein the at least two object instances comprise the second selected instance.

13. The computer storage media of claim 11, wherein the ordering criteria comprises at least one of a filtering query parameter and a sort query parameter.

14. A server comprising:
 at least one processor; and
 a memory storage device associated, the memory storage device including a memory area storing a system management component, wherein the at least one processor executes the system management component to:
 receive a page-to-identifier query received via an application programming interface (API) of a client, the page-to-identifier query including an identifier of a selected instance and an ordering criteria, wherein the selected instance is selected from a first result set, the first result set including a first set of two or more object instances listed in a first order and paginated into a first set of two or more pages, wherein a first page from the first set of two or more pages includes the selected instance, the first page being displayable within a graphical user interface (GUI) of the client, the first page having a first page number, wherein the page-to-identifier query enables the client to work with a list of items without losing user context and to obtain a result set page from a plurality of result set pages that includes a desired object instance, and wherein the page-to-identifier query enables a representational state transfer (REST) API to support a bi-directional page-to-identifier query between a details page and the result set page that includes the desired object instance;
re-order the first result set in accordance with the ordering criteria included in the page-to-identifier query to generate a second result set, the second result set including a second set of two or more object instances listed in a second order, wherein the second order is different from the first order;
paginate the second result set into a second set of two or more pages;
determine that a page in the second set of two or more pages having a page number that corresponds to the first page number excludes the selected instance after re-ordering the first result set;
having determined that the page in the second set of two or more pages having the page number that corresponds to the first page number excludes the selected instance, process the page-to-identifier query to identify another page in the second set of two or more pages that includes a list entry for the selected instance associated with the identifier included in the page-to-identifier query;
form a results page that corresponds to the identified page, the results page including the list entry for the selected instance associated with the identifier included in the page-to-identifier query;
return the results page to the client for display within the GUI of the client;
receive a page-to-identifier query comprising an identifier of a specific instance of an object associated with a specific instance details page to form the selected instance, wherein the specific instance details page provides data associated with the specific instance to the client, wherein other object instances are excluded from the specific instance page, and wherein data associated with any other object instance is excluded from the specific instance details page;
calculate a page index for a page associated with an instances list entry of an instances list for the selected instance to form the results page; and
return the results page comprising the instances list entry for the selected instance to the client in response to the page-to-identifier query, wherein the instances list includes the selected instance.

15. The server of claim 14, wherein the results page includes at least one object instance that is excluded from the first page.

16. The server of claim 14, wherein the at least one processor further executes the system management component to:
process a second page-to-identifier query from the client, the second page-to-identifier query including the at least one ordering criteria and an identifier of a second selected instance that is selected from the results page;
re-order the plurality of object instances in accordance with the at least one ordering criteria to generate a plurality of re-ordered object instances corresponding to the second order, wherein the selected instance is excluded from the results page after the re-ordering of the plurality of object instances;
paginate the plurality of re-ordered object instances to form a re-ordered set of pages, the re-ordered set of pages including at least two pages;
identify a page in the re-ordered set of pages that includes the second selected instance to form a new results page; and
return the new results page to the client for display within the GUI of the client, the new results page including the second selected instance.

17. The server of claim 14, wherein the ordering criteria comprises at least one of a filtering query parameter and a sort query parameter.

18. A computer-implemented method of managing paginated data by a server, the method comprising:
receiving a page-to-identifier query from a client, the page-to-identifier query including an ordering criteria and an identifier of a selected instance, the selected instance being selected from a first result set, the first result set including a plurality of object instances paginated into a first set of pages including at least a first page, the first page of the first set of pages including the selected instance, the first page of the first set of pages being displayable within a graphical user interface (GUI) of the client, wherein the page-to-identifier query enables the client to work with a list of items without losing user context and to obtain a result set page from a plurality of result set pages that includes a desired object instance, and wherein the page-to-identifier query enables a representational state transfer (REST) application programming interface (API) to support a bi-directional page-to-identifier query between a details page and the result set page that includes the desired object instance;
re-ordering, by a processing device associated with the server, the first result set in accordance with the ordering criteria included in the page-to-identifier query to generate a second result set;
paginating, by the processing device associated with the server, the second result set into a second set of pages including a first page and one or more additional pages;
determining that the first page of the second set of pages excludes the selected instance corresponding to the identifier included in the page-to-identifier query;
having determined that the first page of the second set of pages excludes the selected instance, identifying a page among the one or more additional pages of the second set of pages that has a portion of the second result set including the selected instance corresponding to the identifier included in the page-to-identifier query;
forming a results page from the identified page, the results page including at least the selected instance corresponding to the identifier included in the page-to-identifier query;
effectively scrolling the results page so that at least the selected instance is displayable within the GUI of the client;
returning the results page to the client for displaying at least the selected instance within the GUI of the client, while avoiding returning any of the remaining pages of the second set of pages to the client;
receiving a page-to-identifier query comprising an identifier of a specific instance of an object associated with a specific instance details page to form the selected instance, wherein the specific instance details page provides data associated with the specific instance to the client, wherein other object instances are excluded from the specific instance page, and wherein data associated with any other object instance is excluded from the specific instance details page;

calculating a page index for a page associated with an instances list entry of an instances list for the selected instance to form the results page; and returning the results page comprising the instances list entry for the selected instance to the client in response to the page-to-identifier query, wherein the instances list includes the selected instance.

19. The computer-implemented method of claim 18 further comprising:

having effectively scrolled the results page so that at least the selected instance is displayable within the GUI of the client, highlighting the selected instance for display within the GUI of the client.

* * * * *